United States Patent [19]
Einaudi et al.

[11] Patent Number: 5,568,800
[45] Date of Patent: Oct. 29, 1996

[54] FUEL COMBUSTION ENHANCER

[76] Inventors: Luis E. Einaudi, Albino Mireles No. 2608, Col. Zarco C.P. 31020, Chihuahua; Carlos Dominguez, Laguna De Asencion 3500, V Etapa San Felipe, Chihuahua, both of Mexico

[21] Appl. No.: 554,193

[22] Filed: Nov. 6, 1995

[30] Foreign Application Priority Data

Jan. 24, 1995 [MX] Mexico ............................ 950628

[51] Int. Cl.⁶ ............................................. F02M 31/00
[52] U.S. Cl. ............................ 123/546; 123/552; 123/592
[58] Field of Search ............................. 123/552, 557, 123/545, 547, 592, 549, 522, 523

[56] References Cited

U.S. PATENT DOCUMENTS

| | | | |
|---|---|---|---|
| 2,748,758 | 6/1956 | Fairbanks . | |
| 4,267,802 | 5/1981 | Garretson . | |
| 4,270,506 | 6/1981 | Lowe | 123/523 |
| 4,308,137 | 12/1981 | Freeman . | |
| 4,312,317 | 1/1982 | Jewett et al. | 123/522 |
| 4,336,783 | 6/1982 | Henson | 123/557 |
| 4,342,303 | 8/1982 | McCord | 123/557 |
| 4,372,280 | 2/1983 | Adams | 123/557 |
| 4,398,523 | 8/1983 | Henson | 123/557 |
| 4,409,946 | 10/1983 | Sandford et al. | 123/557 |
| 4,458,653 | 7/1984 | Geddes et al. | 123/557 |
| 4,478,607 | 10/1984 | Capps | 123/592 |
| 4,503,833 | 3/1985 | Yunick | 123/545 |
| 4,681,081 | 7/1987 | LaPan | 123/522 |
| 4,781,165 | 11/1988 | Rawlings | 123/552 |
| 5,048,501 | 9/1991 | Smith et al. | 123/554 |
| 5,123,398 | 6/1992 | Klaus et al. | 123/543 |
| 5,137,005 | 8/1992 | Kirby | 123/592 |

*Primary Examiner*—Marguerite McMahon
*Attorney, Agent, or Firm*—Senniger, Powers, Leavitt & Roedel

[57] ABSTRACT

A device for enhancing the combustion of fuel in an internal combustion engine including an evaporation chamber adapted to contain a volume of liquid fuel. The evaporation chamber is adapted for communication with an airstream in the internal combustion engine travelling toward a combustion chamber of the internal combustion engine so that fuel vapor formed in the evaporation chamber may pass into the combustion chamber by operation of the internal combustion engine. A fuel agitator mounted for motion in the evaporation chamber agitates the liquid fuel to promote vaporization of the fuel and is driven by an actuator mounted for motion in the airstream.

20 Claims, 6 Drawing Sheets

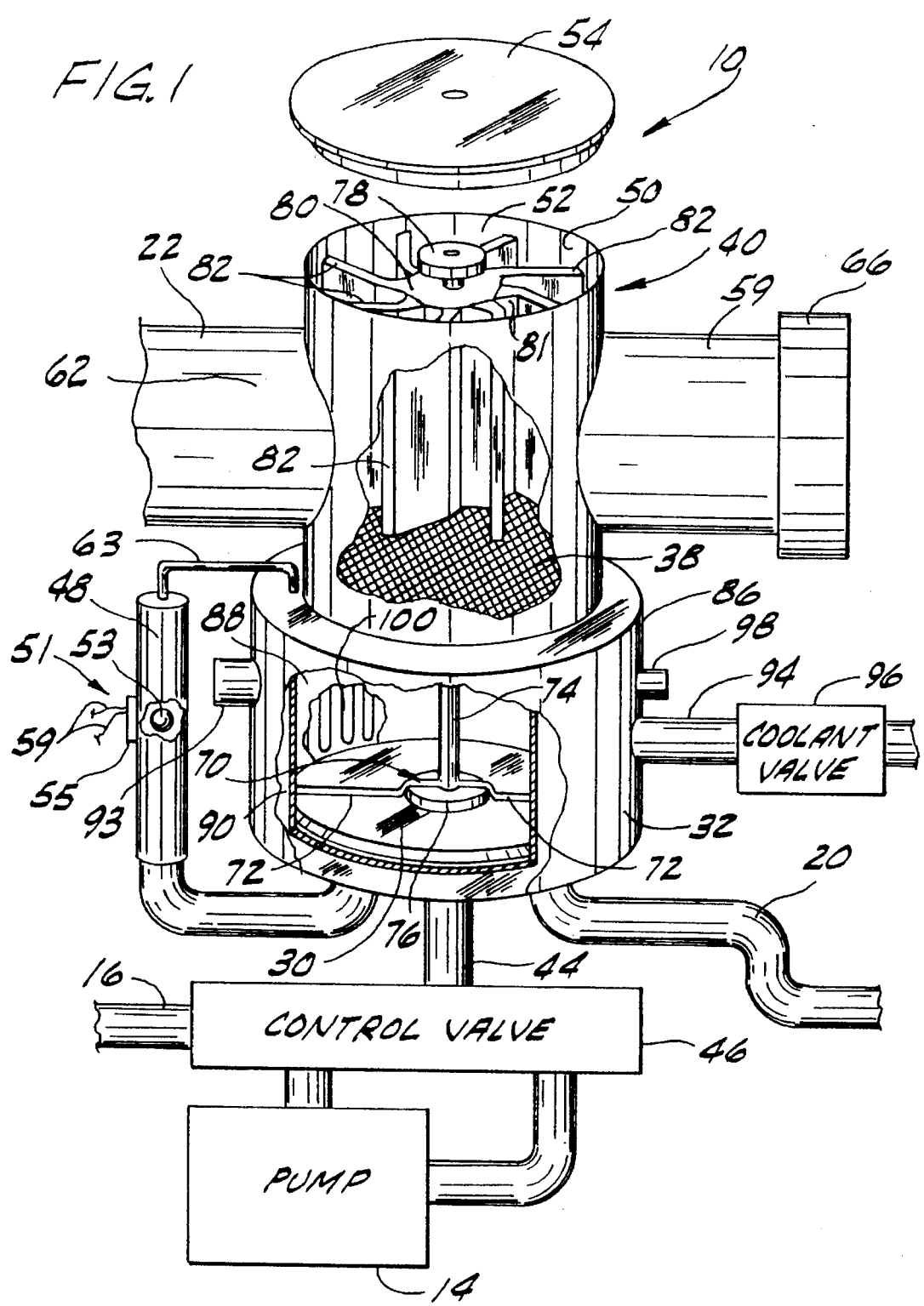

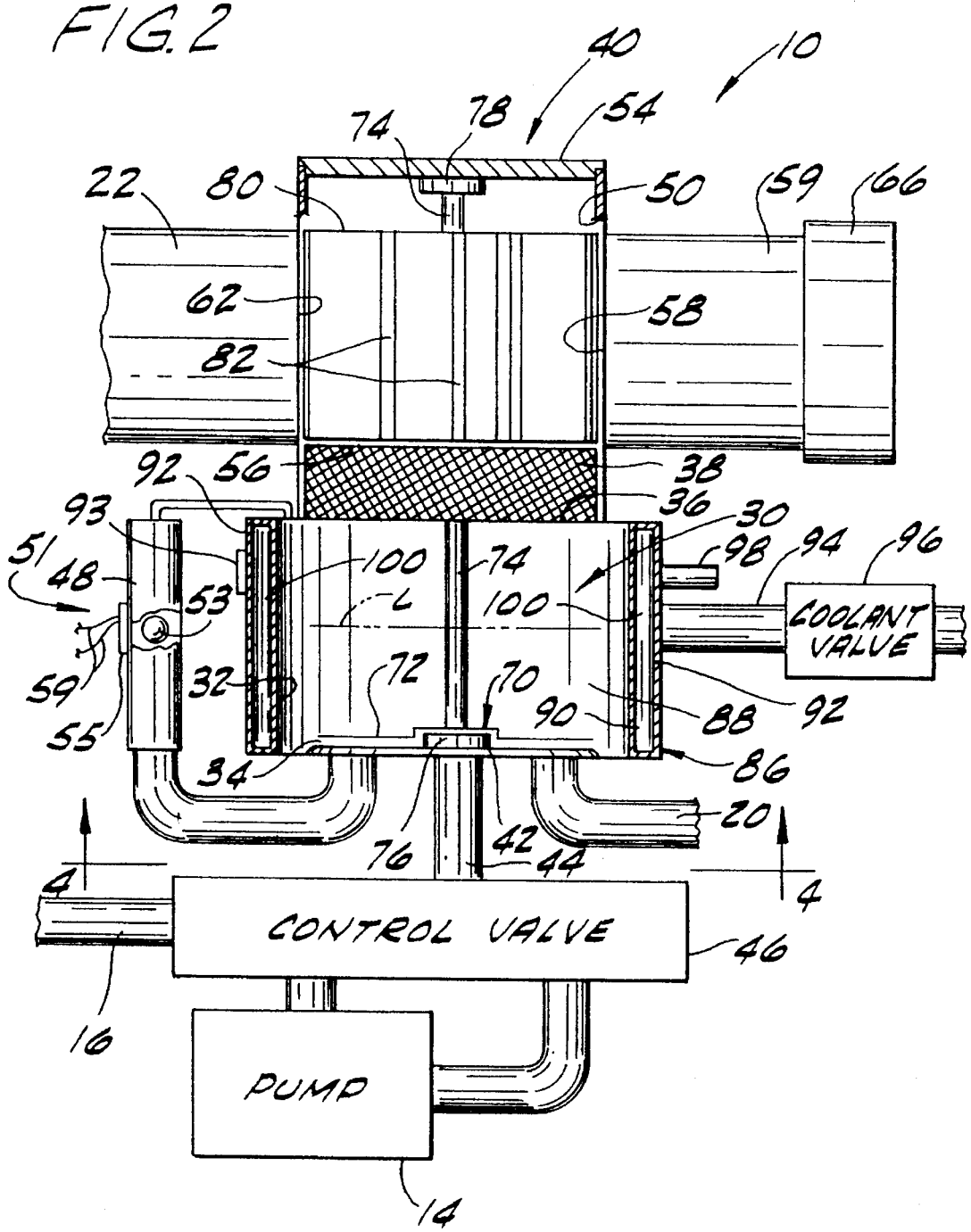

FUEL COMBUSTION ENHANCER

BACKGROUND OF THE INVENTION

This invention relates generally to internal combustion engines and more specifically devices for enhancing the combustion of fuel in an internal combustion engine.

Internal combustion engines use a mixture of air and liquid fuel which is ignited by means of a spark in a combustion chamber. The most efficient combustion occurs when the liquid fuel is volatilized into a vapor prior to entry into the combustion chamber. However, present carburation techniques for liquid fuel still result in fuel reaching the combustion chamber primarily in liquid form. The presence of fuel almost completely in liquid form in the combustion chamber produces an inefficient and incomplete combustion having products which reduce the life of the engine and are also harmful to the environment. The contamination to the engine caused by reaction products such as unburned hydrocarbons, increases the maintenance requirements of the engine (e.g., oil changes and tune ups). Moreover, the combustion of liquid gasoline and air requires more energy than is required for the combustion of a mixture of liquid fuel, fuel vapor and air. This inefficiency results in an increase in fuel consumption.

It is known to increase the presence of fuel in vapor form by heating liquid fuel to produce vapor which is mixed with the air flow to the combustion chambers of the engine (e.g., U.S. Pat. No. 4,398,523). However the production of vapor solely by heating is not sensitive to changes in the demand for fuel by the engine, and does not employ other forms of energy available in the engine to promote vaporization of the fuel. Moreover, the equipment required to vaporize fuel solely by heating is typically large and not easily incorporated into existing internal combustion engine systems.

SUMMARY OF THE INVENTION

Among the several objects and features of the present invention may be noted the provision of a device for enhancing the combustion of fuel in an internal combustion engine; the provision of such a device which increases the amount of fuel in vapor form which is delivered to the combustion chamber; the provision of such a device which responds to instantaneous engine demand to produce more or less fuel vapor; the provision of such a device which reduces fuel consumption; the provision of such a device which reduces the amount of combustion by products having deleterious effects on the engine; and the provision of such a device which reduces the amount of combustion byproducts which are harmful to the environment.

Generally, a fuel combustion enhancer of this invention comprises an evaporation chamber adapted to contain a volume of liquid fuel and to facilitate evaporation of at least some of the volume of fuel. The evaporation chamber has an inlet for receiving the liquid fuel from a reservoir of liquid fuel. The evaporation chamber is adapted for communication with an airstream in the internal combustion engine travelling toward a combustion chamber of the internal combustion engine so that fuel vapor formed in the evaporation chamber may pass into the combustion chamber by operation of the internal combustion engine. A fuel agitator is mounted for motion at a location in the evaporation chamber in which the fuel agitator is immersed in the volume of liquid fuel contained in the evaporation chamber. The fuel agitator is capable of agitating the liquid fuel to promote vaporization of the fuel in the evaporation chamber.

Other objects and features of the present invention will be in part apparent and in part pointed out hereinafter.

BRIEF DESCRIPTION OF THE DRAWINGS

FIG. 1 is a schematic perspective view of a combustion enhancer of this invention, parts being broken away to show detail;

FIG. 2 is a partial cross sectional view of the combustion enhancer of FIG. 1;

Corresponding reference characters indicate corresponding parts throughout the several views of the drawings.

DETAILED DESCRIPTION OF THE PREFERRED EMBODIMENT

Figure 5:
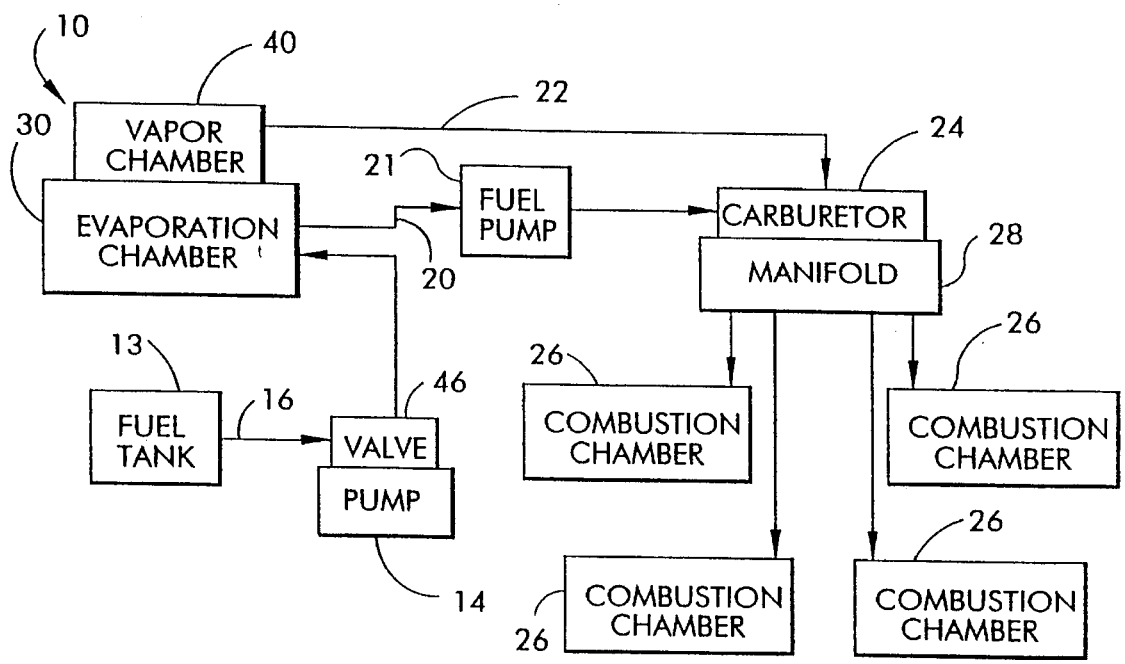
FIG. 5 is a schematic illustration of the combustion enhancer in an internal combustion engine.

Referring now to the drawings, and in particular to FIG. 5, a device for enhancing the combustion of fuel (generally indicated at 10) is shown as part of an internal combustion engine including a fuel tank 13, and an electric pump 14 for forcing fuel from the tank through a delivery line 16 to the device. The liquid fuel is drawn from the evaporation chamber through line 20 by a fuel pump 21 and is directed to a carburetor 24. The carburetor 24 and fuel pump 21 may be of conventional construction. An air line 22 leads from vapor chamber 40 to the carburetor 24. Multiple combustion chambers 26 are fed a fuel-air mixture from the carburetor 24 by way of a manifold 28.

Figure 4:
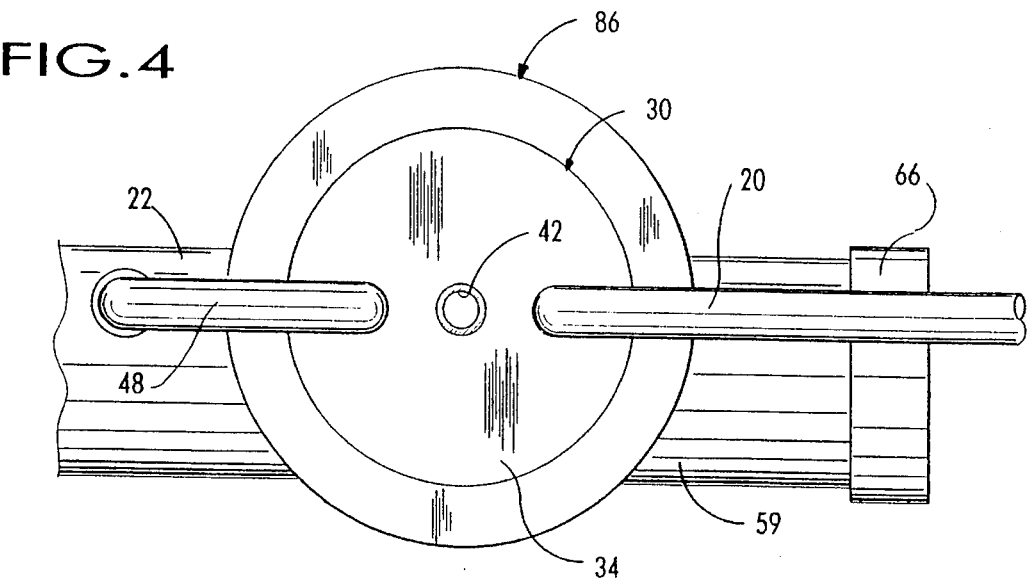
FIG. 4 is a bottom plan view of the combustion enhancer of FIG. 1 as seen from the vantage indicated by line 4—4 in FIG. 2.

As shown in FIGS. 1 and 2, the device includes an evaporation chamber (generally indicated at 30), defined by a cylindrical side wall 32, a bottom wall 34 and an open top 36 closed by a filter 38 which permits communication of fuel vapor to a vapor chamber (generally indicated at 40) located above the evaporation chamber, but blocks the transmission of liquid fuel to the vapor chamber. The evaporation chamber 30 has an inlet 42 connected to a fuel delivery line 44 for receiving liquid fuel from the fuel tank 13 by way of a directional valve 46 (FIG. 4). The pump 14 forces fuel from the tank into directional valve 46 and into the evaporation chamber 30. A fuel level control 48 operates (by way of an electronic control unit 49) the directional valve 46 to de-energize the pump 14 and block fuel from entering the evaporation chamber 30 when the fuel in the chamber reaches a predetermined level L, and to direct fuel to the chamber when the level of fuel falls below the predetermined level.

The level control 48 includes a level sensor, generally indicated at 51. The level sensor comprises a float 53, and a reed switch 55 attached to the outer wall of the level control 48. The float 53 is a ball which is preferably made out of a polymer material having metallic particles dispersed throughout. The metallic material in the ball actuates the reed switch 55 by coming into contact with a magnetic field of the reed switch. Upon the reed switch being activated it sends an on or off signal to the electronic control unit 49. The float 53 has a density which allows it to float upon the upper surface of the liquid fuel contained within the level control 48. The level of the liquid fuel within the level control 48 varies with the level of liquid fuel within the evaporation chamber 30. A breath tube 63 connects the space in the level control 48 above the liquid fuel to the top of the evaporation chamber 30 for equalizing the gas pressure above the liquid fuel in the evaporation chamber and the level control so that the float 53 provides an accurate reading of the level of liquid fuel in the evaporation chamber. The reed switch 55 is located at a height on the level control 48 corresponding to the level at which the evaporation chamber 30 contains the optimum amount of liquid fuel. When the metallic float 53 comes within the proximity of the reed switch 55, an electric signal is sent from the reed switch through wires 59 to the electronic control unit 49. The electronic control unit 49 subsequently sends a signal to the control valve 46 to either open up or close off the flow of fuel from fuel tank 13 to the evaporation chamber 30.

Figure 1A:
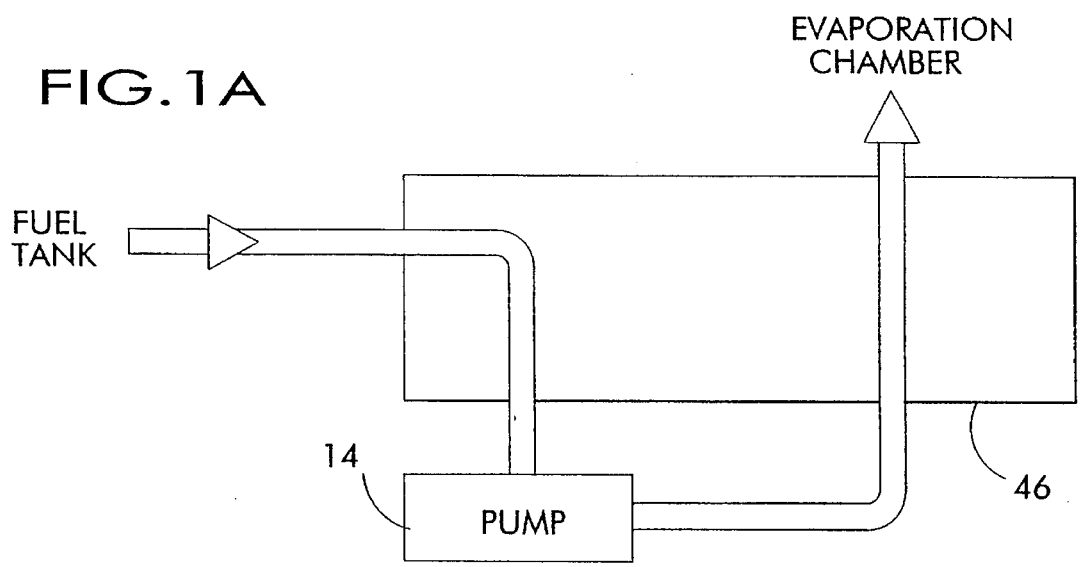
FIG. 1A is a hydraulic schematic of a control valve of the combustion enhancer of FIG. 1 shown in a first position.
Figure 1B:
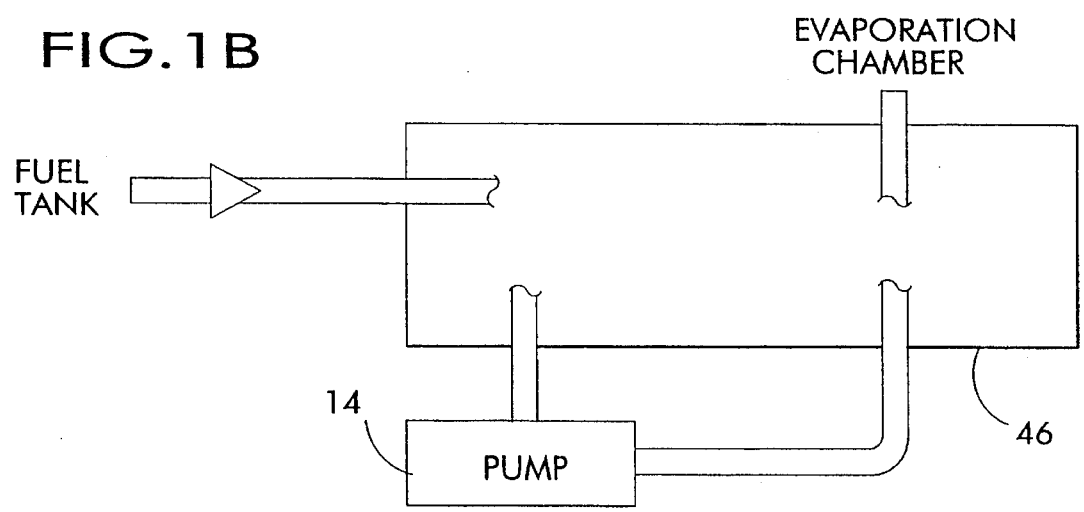
FIG. 1B is a hydraulic schematic of the control valve in a second position.
Figure 1C:
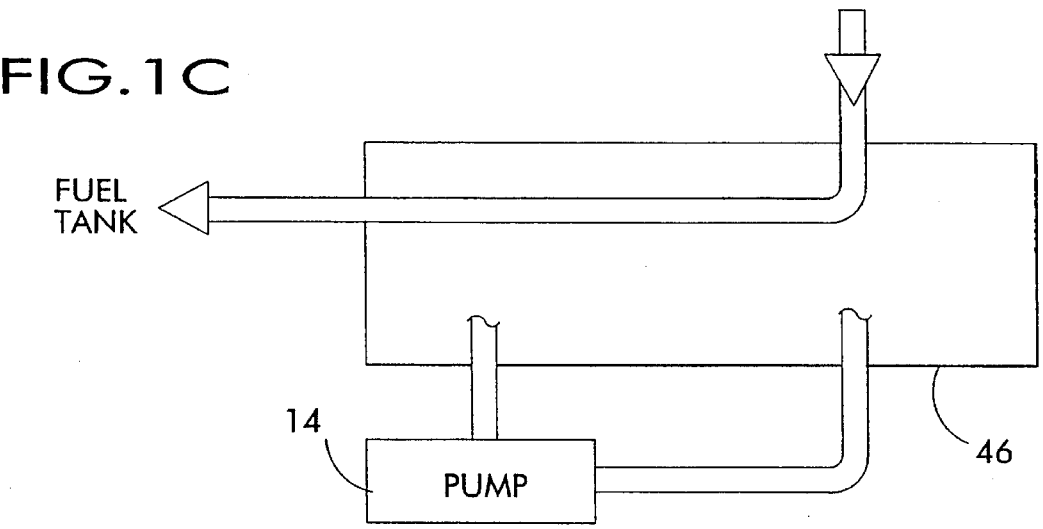
FIG. 1C is a hydraulic schematic of the control valve in a third position.

As shown in FIGS. 1A–1C, the control valve 46 is a four-way, three position control valve. FIG. 1A shows the valve in a first position (fill) wherein the fuel tank 13 is in communication with the evaporation chamber 30 by means of a pump 14. FIG. 1B shows the valve in a second position (closed) wherein the evaporation chamber 30 is blocked off from the fuel tank 13. A third position (drain) is shown in FIG. 1C wherein the evaporation chamber 30 is in communication with the fuel tank 13 for draining the liquid fuel out of the evaporation chamber and back into the fuel tank. The control valve 46 moves into its third position when the engine is shut off. An ignition switch 61 is electronically connected to the electronic control unit 49 and sends a signal whenever the engine is turned off. The electronic control unit 49 subsequently sends an electronic signal to the control valve 46 which results in the control valve moving into its drain position. The electronic control unit 49 contains a five to seven second time delay after which another signal is sent to the control valve 46 to move it back to its closed position, closing off the evaporation chamber 30 from the fuel tank 13 leaving the evaporation chamber empty when the engine is not running.

As described more fully hereinafter, the liquid fuel is heated and agitated so that a substantial quantity undergoes a phase change to vapor in the evaporation chamber 30. The fuel in vapor form travels upwardly through the open top 36 of the evaporation chamber 30 and filter 38 to the adjacent vapor chamber 40.

The fuel vapor chamber 40 is defined by a generally cylindrical side wall 50, an open top 52 sealingly closed by a removable cap 54, and an open bottom 56 closed by the filter 38. The fuel vapor chamber 40 has an air inlet 58 in its side wall for receiving ambient air from a feed tube 59 connected to the inlet, and an air outlet 62 in a generally opposite portion of the side wall 50. The air outlet 62 is connected by the air line 22 for communication with the combustion chambers 26 of the internal combustion engine (via the carburetor 24 and engine manifold 28) so that air is drawn into the vapor chamber 40 through the air inlet 58, flows across the vapor chamber in a stream (indicated by arrow A in FIG. 3) and passes out of the outlet 62 to the combustion chamber 26 as a result of the vacuum drawn by the internal combustion engine. An air filter 66 is attached in the inlet of the feed tube 59 to prevent contaminants from entering the vapor chamber 40 and eventually reaching the combustion chambers 26 and other parts of the engine.

The evaporation chamber 30 contains a fuel agitator (indicated generally at 70), mounted near the bottom wall 34 of the chamber in a location in which it will always be immersed in the volume of liquid fuel contained in the evaporation chamber. The approximate level of fuel maintained in the evaporation chamber 30 by the fuel level control 48 is indicated by line L in FIG. 2. The fuel agitator, generally indicated at 70, is capable of agitating the liquid fuel to promote vaporization of the fuel in the evaporation chamber 30. In the preferred embodiment, the agitator 70 includes a flat steel member 72 (broadly, "a thin member") mounted generally at its middle on a shaft 74 and extending perpendicularly outwardly from the shaft in opposite directions. It is to be understood that the agitator 70 may take on other forms, such as being comprised of a greater or lesser number of thin members and still fall within the scope of the present invention. Moreover, the thin member may be made of other suitable materials (e.g., plastic).

Figure 3:
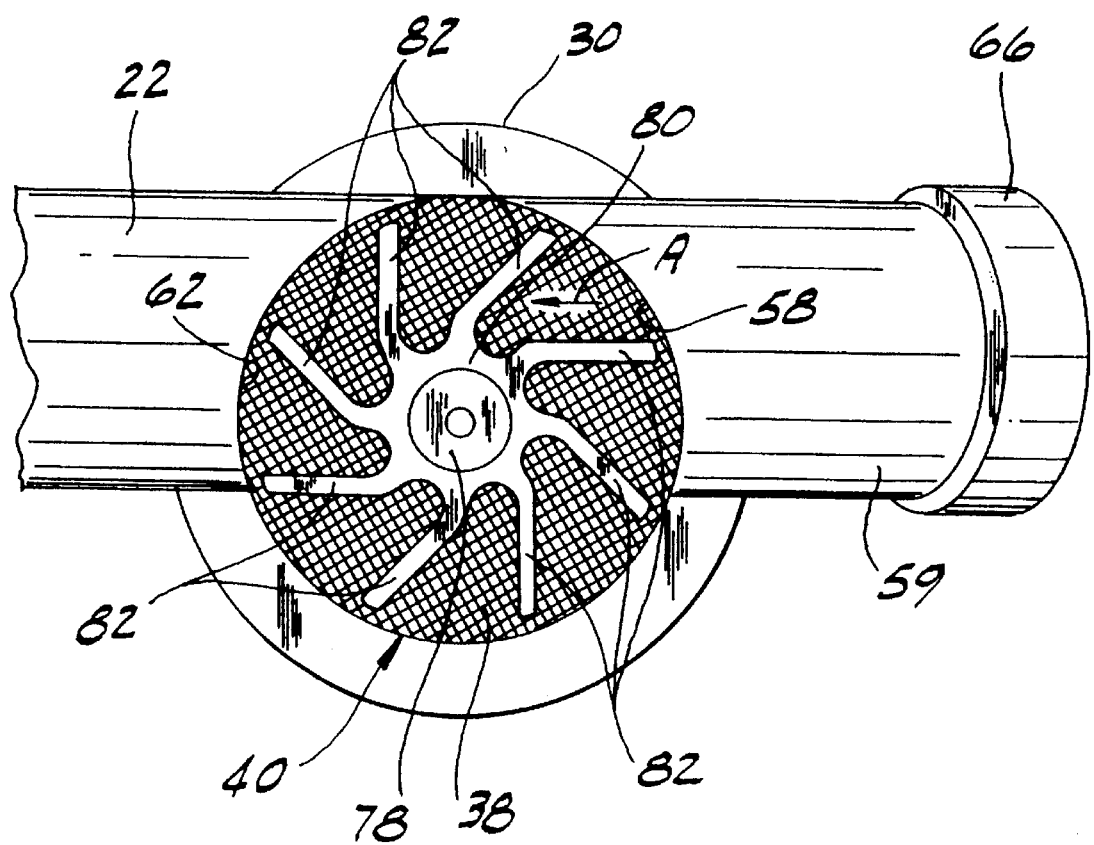
FIG. 3 is a top plan view of the combustion enhancer of FIG. 1, with a top cap of a vapor chamber of the combustion enhancer being removed to show detail.

The shaft 74 is connected by a first bushing 76 for rotation on the bottom wall 34 of the evaporator chamber and extends upwardly through the filter 38 and into the vapor chamber 40 where it is mounted by a second bushing 78 on the cap 54 of the vapor chamber. In this way, the shaft 74 is mounted for free rotation about its longitudinal axis within the device. The vapor chamber 40 has an actuator, such as a rotor 80, fixedly mounted on the shaft 74 for motion in the stream of air A which flows across the vapor chamber 40 from the air inlet 58 to the air outlet 62. The rotor 80 is made of a suitable material, such as plastic, and comprises a hub 81 having a plurality of vanes 82 extending therefrom and shaped and arranged for converting a portion of the kinetic energy of the air in the stream of air into rotation of the rotor about its axis (FIG. 3). Each vane 82 extends radially outwardly from the hub 81 a short distance and then turns to extend rearwardly (with respect to the direction of rotation of the rotor 80) from a plane passing through the center of the hub and the intersection of the vane 82 and the hub. The shape of the vanes 82 helps to assure that the rotor 80 turns in only one direction (counter-clockwise as seen in FIG. 3) in the airstream A. The air inlet 58 and air outlet 62 are laterally offset from the center of the vapor chamber 40 so that the stream of air A flows through the vapor chamber mostly to one side of the center of the chamber. The offset facilitates the rotation of the rotor 80. The rotor 80 is connected by the shaft 74 to the thin member 72 which is also fixed to the shaft for conjoint rotation with the shaft so that motion of the rotor is transmitted to the fuel agitator 70. Thus, some of the kinetic energy of the air stream is transmitted to the liquid fuel in the evaporation chamber 30 by spinning the agitator, causing an increase in the vapor pressure of the agitated liquid.

The rotor 80 is actuated by the passing of air through the vapor chamber 40. The air is drawn through the vapor chamber 40 by suction from the combustion chambers 26 which are downstream from the vapor chamber 40. The more air drawn by the combustion chamber 26, the faster the air is moved through the vapor chamber 40, and the faster the rotor 80 rotates. The velocity of rotation of the rotor 80 is, therefore, directly proportional to the speed of the motor. As a result, the faster the engine runs, the greater the level of agitation of the volume of liquid fuel and the more fuel vapor is delivered to the air stream A for combustion. Accordingly, the device of the present invention is proportionally responsive to the changing fuel requirements of the engine.

Figure 6:
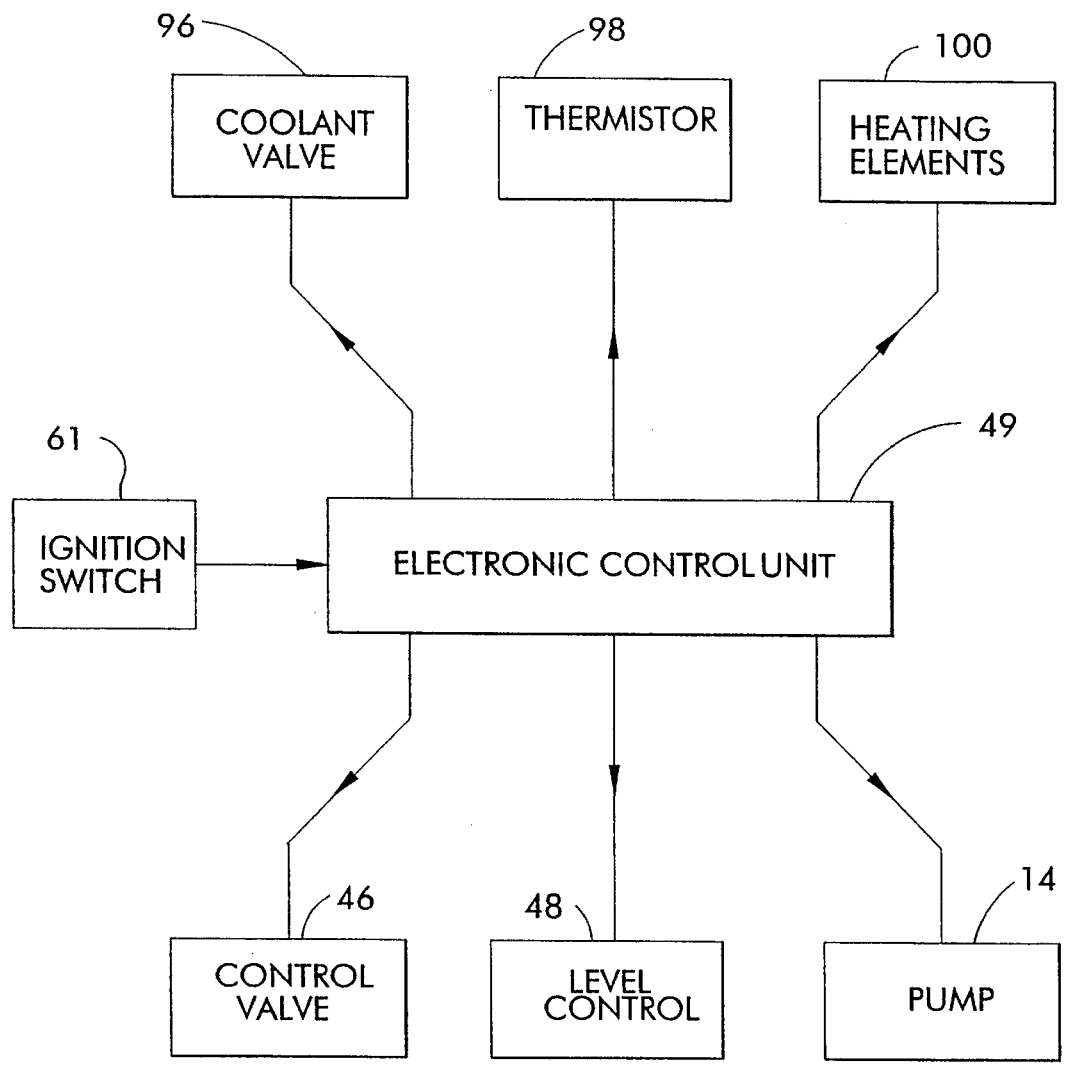
FIG. 6 is a schematic illustrating electrically controlled elements of the combustion enhancer of FIG. 1.

Referring again to FIG. 2, the rate of evaporation of the fuel is increased by heating the liquid fuel in the evaporation chamber. A jacket 86 surrounding the evaporation chamber 30 includes inner and outer cylindrical side walls (designated 88 and 90 respectively), a top wall 91 and a bottom wall 93. In the illustrated embodiment, the inner side wall 88 of the jacket and the side wall 32 of the evaporation chamber are the outer and inner surfaces of a unitary wall. The jacket 86 has an inlet 92 for admitting coolant heated by the internal combustion engine into the jacket. Heat from the coolant is transferred through the inner side wall 88 of the jacket 86 and side wall 32 of the evaporation chamber 30 to heat the volume of fuel in the evaporation chamber and out of the jacket through an outlet 93. A conduit 94 for delivery of engine coolant from the engine cooling system (not shown) to the inlet 92 of the jacket 86 includes a solenoid valve 96 disposed in the conduit operable to control the flow of engine coolant to the jacket. A thermal sensor 98 reads the temperature of engine coolant in the jacket 86 and operates the valve in response to the temperature reading. As shown in FIG. 6, the coolant valve 96 and thermistor 98 are electronically connected to the electronic control unit 49. If the measured temperature of the engine coolant is below approximately 68° C. (154° F.) the thermal sensor 98 sends a signal to the electronic control unit 49 which in turn sends a signal to the coolant valve 96, shutting off the flow of coolant into the jacket. When the coolant temperature in the jacket 86 is above approximately 68° C. the coolant valve 96 is opened to permit flow into the jacket. The valve 96 may be, for example, a two-way, two position control valve. The thermal sensor 98 may be a thermistor or any other suitable device.

In addition, there are electrical heating elements 100 disposed within the jacket 86 which are capable of selective activation for heating the coolant in the jacket 86 (FIG. 1). In the preferred embodiment, the heating elements 100 are connected to a source (e.g., an automobile battery or alternator, not shown) for power and to the control unit 49 which operates the elements in response to the readings from the thermal sensor. When the temperature of the coolant measured by the thermal sensor 98 drops below approximately 68° C. the electronic control unit 49 activates the heating elements 100. When the temperature increases above approximately 68° C. the heating elements are turned off. It is to be understood that the activation temperature for the valve 96 and heating elements 100 may be set at other levels and still fall within the scope of the invention.

In the preferred embodiment, the electrical resistance heating is used to augment heating from the engine coolant (by increasing the temperature of the coolant) when the engine is cold (e.g., immediately after start up), but could be used alone to heat the liquid fuel.

Some of the heated volume of liquid fuel in the evaporation chamber 30 is delivered in liquid form through the fuel line 20 to the carburetor 24 where it is aspirated into the flow of air passing through the carburetor. The air stream flowing through the carburetor is the same which previously passed through the vapor chamber 40, picking up fuel vapor generated in the evaporation chamber. The heated liquid fuel is more likely to undergo a phase change to vapor in the carburetor than fuel which is not heated. Accordingly, additional optimization of the fuel/air mixture is achieved by further increasing the presence of fuel in vapor form in the mixture ultimately reaching the combustion chambers 26.

The operation of the device can be summarized as follows: Liquid fuel is delivered to the evaporation chamber 30 where it is acted upon by the agitator 70. The agitator 70 is driven by the rotor 80 which is rotated by the passing of air drawn through the vapor chamber 40 by suction created by the engine. The wall 32 of the evaporation chamber 30 is heated by electrical resistance 100 and/or hot engine coolant flowing through the jacket 86 surrounding the evaporation chamber which is controlled by a temperature sensor 98 and valve 96. The agitation of the liquid fuel along with the transmission of heat to the liquid fuel causes the separation of fuel vapor from the liquid fuel. The filter 38 located between the outlet 36 of the evaporation chamber 30 and the inlet to the vapor chamber 40 allows only the generated fuel vapor to enter the vapor chamber. The fuel vapor is then mixed with air flowing through the vapor chamber 40. The amount of vapor produced is proportional to the speed of the air stream passing through the vapor chamber 40, which is proportional to the demand for fuel by the engine. Accordingly, the combustion enhancer produces fuel vapor in proportion to the engine's demand for fuel. The mixture of air and fuel vapor is delivered to the carburetor 24 and thence to the combustion chamber 26. At the same time, heated liquid fuel is delivered to the carburetor 24 where it is mixed with the air and fuel vapor mixture.

This device may be easily incorporated into existing automobile engines or other machines driven by internal combustion engines. The device can be installed and connected to an existing fuel supply line, and a line connected to the air supply that feeds the motor. The combination of agitation and heating of the liquid fuel significantly reduces the size required for the evaporation chamber and associated equipment, thus making installation into an existing engine much simpler.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for enhancing the combustion of fuel in an internal combustion engine, the device comprising:

an evaporation chamber adapted to contain a volume of liquid fuel and to facilitate evaporation of at least some of the volume of fuel, the evaporation chamber having an inlet for receiving the liquid fuel from a reservoir of liquid fuel;

the evaporation chamber being adapted for communication with an airstream in the internal combustion engine travelling toward a combustion chamber of the internal combustion engine so that fuel vapor formed in the evaporation chamber may pass into the combustion chamber by operation of the internal combustion engine;

a fuel agitator mounted for motion at a location in the evaporation chamber in which the fuel agitator is immersed in the volume of liquid fuel contained in the evaporation chamber, the fuel agitator being capable of agitating the liquid fuel to promote vaporization of the fuel in the evaporation chamber;

an actuator for actuating movement of the fuel agitator in response to the demand for fuel by the internal combustion engine.

2. A device as set forth in claim 1 wherein the fuel agitator comprises a thin member extending generally perpendicularly outwardly from the shaft and connected to the shaft for conjoint rotation therewith.

3. A device as set forth in claim 1 wherein the actuator is disposed for motion in said airstream, the actuator being shaped and arranged for converting a portion of the kinetic energy of the air in the airstream into motion of the actuator, the actuator being operatively connected to the fuel agitator whereby motion of the actuator is transmitted to the fuel agitator for agitation of the volume of liquid fuel.

4. A device as set forth in claim 3 wherein the actuator comprises a rotor mounted for rotation with respect to the evaporation chamber, said rotor comprising a hub and a plurality of vanes, the vanes each extending rearwardly, with respect to the direction of rotation of the rotor, from a radial plane passing through the center of the hub and the intersection of the vane and the hub.

5. A device as set forth in claim 4 further comprising a shaft extending generally from said rotor to the evaporation chamber and mounted for rotation about an axis.

6. A device as set forth in claim 1 further comprising means for heating the volume of liquid fuel in the evaporation chamber and an outlet for delivery of heated liquid fuel from the evaporation chamber to the airstream at a location downstream of the evaporation chamber and upstream of the combustion chamber of the internal combustion engine for mixing the heated liquid fuel with fuel vapor laden air in the airstream.

7. A device as set forth in claim 6 wherein said heating means comprises a jacket generally surrounding the evaporation chamber, the jacket having an inlet for admitting coolant heated by the internal combustion engine into the jacket to heat the volume of fuel in the evaporation chamber, and an outlet through which engine coolant exits the jacket.

8. A device as set forth in claim 7 wherein said heating means further comprises an electrical resistance heater disposed for thermal communication with the coolant in the jacket for selectively heating the coolant.

9. A device as set forth in claim 6 wherein said heating means comprises an electrical resistance heater in thermal communication with the evaporation chamber for selectively heating the volume of liquid fuel in the chamber.

10. A device as set forth in claim 7 further comprising a conduit for delivery of engine coolant to the inlet of the jacket, a coolant valve disposed in said conduit and operable to control the flow of engine coolant to the inlet of the jacket, a thermal sensor capable of reading the temperature of engine coolant in the jacket, and an electronic control unit for receiving an input signal from said thermal sensor and sending an output signal to said coolant valve for closing the coolant valve when the temperature reading is below a set point value and opening the coolant valve when the temperature reading is above the set point value.

11. A device as set forth in claim 1 further comprising an electronic control unit, a level sensor for sensing the level of fuel in the evaporation chamber and sending a signal to the electronic control unit upon the liquid fuel reaching a predetermined level in the evaporation chamber, a pump for pumping fuel from the liquid fuel reservoir to the evaporation chamber, and a control valve having a first position wherein the reservoir of liquid fuel is in communication with the pump and the evaporation chamber for passage of fuel into the evaporation chamber and a second position wherein the evaporation chamber is blocked off from the reservoir of liquid fuel, the control unit being operable to move the control valve to the first position when the level of fuel sensed by the level sensor is below the predetermined level and to move the control valve to the second position when the level of fuel sensed by the level sensor is above the predetermined level.

12. A device as set forth in claim 11 wherein said control valve has a third position wherein the evaporation chamber is in communication with the reservoir of liquid fuel for draining the liquid fuel out of the evaporation chamber, said control valve moving to its third position upon receiving a signal from the electronic control unit in response to the internal combustion engine being shut off.

13. A device as set forth in claim 12 wherein the control unit comprises a timer activated upon shut off of the internal combustion engine to keep the control valve in the third position for a predetermined time and to signal the control valve to move to the second position when the predetermined time has elapsed.

14. A device for enhancing the combustion of fuel in an internal combustion engine, the device comprising:

an evaporation chamber adapted to contain a volume of liquid fuel and to facilitate evaporation of at least some of the volume of fuel, said evaporation chamber having an inlet for receiving the liquid fuel from a reservoir of liquid fuel;

a fuel vapor chamber adjacent to said evaporation chamber and in communication therewith, said fuel vapor chamber having an air inlet and an air outlet, the air outlet being adapted to communicate with a combustion chamber of the internal combustion engine so that air is drawn into said vapor chamber through the air inlet, flows across said vapor chamber in a stream and passes out the outlet to the combustion chamber by operation of the internal combustion engine;

a filter interposed between said evaporation chamber and said vapor chamber, the filter being constructed to permit passage of vaporous fuel from said evaporation chamber to said vapor chamber and prevent passage of liquid fuel from said evaporation chamber to said vapor chamber;

a fuel agitator mounted for motion at a location in said evaporation chamber in which the fuel agitator is immersed in the volume of liquid fuel contained in said evaporation chamber, the fuel agitator being capable of agitating the liquid fuel to promote vaporization of the fuel in said evaporation chamber; and an actuator mounted for motion in said vapor chamber in said stream of air which flows across said vapor chamber from the air inlet to the air outlet, the actuator being shaped and arranged for converting a portion of the kinetic energy of the air in the stream of air into motion of the actuator, the actuator being operatively connected to the fuel agitator whereby motion of the actuator is transmitted to the fuel agitator for agitation of the volume of liquid fuel.

15. A device as set forth in claim 14 wherein the actuator comprises a rotor mounted for rotation with respect to the evaporation chamber, said rotor comprising a hub and a plurality of vanes, the vanes each extending rearwardly, with respect to the direction of rotation of the rotor, from a radial plane passing through the center of the hub and the intersection of the vane and the hub.

16. A device as set forth in claim 15 wherein the fuel agitator comprises a thin member extending generally perpendicularly outwardly from the shaft and connected to the shaft for conjoint rotation therewith.

17. A device as set forth in claim 14 further comprising means for heating the volume of liquid fuel in the evaporation chamber and an outlet for delivery of heated liquid fuel from the evaporation chamber to the airstream at a location downstream of the evaporation chamber and upstream of the combustion chamber of the internal combustion engine for mixing the heated liquid fuel with fuel vapor laden air in the airstream.

18. A device as set forth in claim 17 wherein said heating means comprises a jacket generally surrounding said evaporation chamber, the jacket having an inlet for admitting coolant heated by the internal combustion engine into the jacket to heat the volume of fuel in said evaporation chamber, and an outlet through which engine coolant exits the jacket.

19. A device as set forth in claim 17 wherein said heating means further comprises an electrical resistance heater in thermal communication with said evaporation chamber for selectively heating the volume of liquid fuel in the chamber.

20. A device as set forth in claim 14 further comprising an electronic control unit, a level sensor for sensing the level of fuel in the evaporation chamber and sending a signal to the electronic control unit upon the liquid fuel reaching a predetermined level, a pump for pumping fuel from the liquid fuel reservoir to the evaporation chamber, and a control valve having a first position wherein the reservoir of liquid fuel is in communication with the pump and the evaporation chamber for delivering fuel from the liquid fuel reservoir to the evaporation chamber, a second position wherein the evaporation chamber is blocked off from the reservoir of liquid fuel, and a third position wherein the evaporation chamber is in communication with the reservoir of liquid fuel for draining the liquid fuel out of the evaporation chamber back to the liquid fuel reservoir, the control unit being operable to move the control valve to the first position when the level of fuel sensed by the level sensor is below the predetermined level, to move the control valve to the second position when the level of fuel sensed by the level sensor is above the predetermined level, and to move the control valve to its third position upon receiving a signal from the electronic control unit in response to the engine being shut off.

* * * * *